US012734971B2

(12) United States Patent
Mohar Castillo et al.

(10) Patent No.: US 12,734,971 B2
(45) Date of Patent: Sep. 15, 2026

(54) VEHICLE CARGO NET SYSTEM

(71) Applicant: Ford Global Technologies, LLC, Dearborn, MI (US)

(72) Inventors: María Fernanda Mohar Castillo, Atizapán de Zaragoza (MX); Regina Adriana Reyes Flores, Atizapan de Zaragoza (MX); Raúl Eduardo Hernández Araujo, Mexico City (MX); Ligia Olivares Espinosa, Atizapan de Zaragoza (MX); Rafael González Juárez, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 18/959,826

(22) Filed: Nov. 26, 2024

(65) Prior Publication Data

US 2026/0145615 A1 May 28, 2026

(51) Int. Cl.
*B60R 7/00* (2006.01)

(52) U.S. Cl.
CPC .................................... *B60R 7/005* (2013.01)

(58) Field of Classification Search
CPC ......... B60R 7/005; B60R 7/043; B60R 5/047; B60N 2002/0905; B60P 7/0876
USPC .......................................................... 224/572
See application file for complete search history.

(56) References Cited

U.S. PATENT DOCUMENTS 5,207,260 A 5/1993 Commesso
5,282,556 A 2/1994 Bossert
6,349,986 B1 2/2002 Seel et al.
6,607,241 B2 * 8/2003 Johnston .................. B60N 2/20 297/188.2
7,350,681 B2 * 4/2008 Polburn .................. B60R 7/005 296/37.16
7,427,103 B2 9/2008 Weber
7,717,484 B2 * 5/2010 Parle ....................... B60R 21/06 296/24.46
9,421,932 B2 * 8/2016 Renforth ............... B60R 21/026
9,463,752 B1 * 10/2016 Lehtonen .................. B60R 7/08
(Continued)

FOREIGN PATENT DOCUMENTS

| | | |
|---|---|---|
| CN | 209719330 U | 12/2019 |
| DE | 102017124737 A1 | 4/2018 |

OTHER PUBLICATIONS

Kiturek, Car Trunk Organizer Storage Bag, Waterproof Backseat Hanging Organizer with Robust Elastic Net, Car Trunk Tidy Organizer with 9 Large Storage Bag for SUV Container, Travel Storage Saves Space (Black), Amazon, https://www.amazon.com/Car-Organizer-Storage-Bag-Waterproof/dp/B0D3XFJWD9?th=1.

*Primary Examiner* — Adam J Waggenspack
(74) *Attorney, Agent, or Firm* — Vichit Chea; Price Heneveld LLP

(57) ABSTRACT

A cargo net assembly for a vehicle includes a first pillar having a lower end connected to a seatback of a seat assembly and an upper end configured with a headrest post connector for connecting to a headrest post on an upper end of the seatback. A second pillar having a lower end is configured to connect to the seatback and a second headrest post connector at an upper end for connecting to a headrest post. The second pillar is movable relative to the first pillar. Netting extending from the first pillar to the second pillar is configured for holding cargo.

18 Claims, 8 Drawing Sheets

(56) References Cited

U.S. PATENT DOCUMENTS 10,576,869 B2 * 3/2020 Villacres Mesias ...... B60R 7/04
2006/0075759 A1 4/2006 Krieger et al.
2006/0103155 A1 * 5/2006 Spater .................... B60R 21/06 296/24.46
2010/0158630 A1 * 6/2010 Combs, Jr. ............. B60R 7/005 410/118
2016/0096455 A1 * 4/2016 Zimmerman ........... B60N 2/90 297/463.1
2016/0318451 A1 11/2016 Li
2018/0208103 A1 7/2018 Villacres Mesias

* cited by examiner

VEHICLE CARGO NET SYSTEM

FIELD OF THE DISCLOSURE

The present disclosure generally relates to vehicle cargo retention assemblies, and more particularly relates to a cargo net assembly for use on a motor vehicle.

BACKGROUND OF THE DISCLOSURE

Motor vehicles are commonly equipped with cargo areas with space available for storing cargo. Cargo may be transported on the floor in the cargo areas and may be retained in place. It may be desirable to provide for an efficient cargo retainer assembly for retaining the cargo in the vehicle.

SUMMARY OF THE DISCLOSURE

According to a first aspect of the present disclosure, a cargo net assembly for a vehicle includes a first pillar having a lower end connected to a seatback of a seat assembly and an upper end configured with a headrest post connector for connecting to a headrest post on an upper end of the seatback. A second pillar having a lower end is configured to connect to the seatback and a second headrest post connector at an upper end for connecting to a headrest post. The second pillar is movable relative to the first pillar. Netting extending from the first pillar to the second pillar is configured for holding cargo.

Embodiments of the first aspect of the present disclosure can include any one or a combination of the following features:

- the second pillar is configured to disconnect from one headrest post and connect to another headrest post to adjust a size of the netting;
- the first pillar comprises a fixed pillar;
- a roller mechanism operatively coupled to one of the first and second pillars for retracting and extending the netting during movement of the second pillar relative to the first pillar;
- the roller mechanism is operatively coupled to the first pillar;
- the second headrest post connector comprises a latch mechanism;
- the first headrest post connector comprises a latch mechanism;
- the lower end of the second pillar comprises a hook for engaging a slot in a lower support structure;
- the lower support structure has a plurality of slots that are selectively engageable with the hook;
- the lower ends of the first and second pillars are supported by one or more brackets fixed to the seat assembly; and
- the one or more brackets include an ISOFIX bracket.

According to a second aspect of the present disclosure, a vehicle seat assembly has a seat base, a seatback, one or more headrests connected to the seatback with a plurality of headrest posts, and a cargo net assembly. The cargo net assembly includes a first pillar having a lower end connected to the seatback of a seat assembly and an upper end configured with a headrest post connector for connecting to a first headrest post on an upper end of the seatback. A second pillar having a lower end is configured to connect to the seatback and a second headrest post connector at an upper end for connecting to a second headrest post. The second pillar is movable relative to the first pillar. Netting extending from the first pillar to the second pillar is configured for holding cargo.

Embodiments of the second aspect of the present disclosure can include any one or a combination of the following features:

- the second pillar is configured to disconnect from one headrest post and connect to another headrest post to adjust a size of the netting;
- the first pillar comprises a fixed pillar;
- a roller mechanism operatively coupled to one of the first and second pillars for retracting and extending the netting during movement of the second pillar relative to the first pillar;
- the roller mechanism is operatively coupled to the first pillar;
- the first and second headrest post connectors comprise first and second latch mechanisms;
- the lower end of the second pillar comprises a hook for engaging a slot in a lower support structure;
- the lower support structure has a plurality of slots that are selectively engageable with the hook; and
- the lower ends of the first and second pillars are supported by one or more brackets fixed to the seat assembly.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
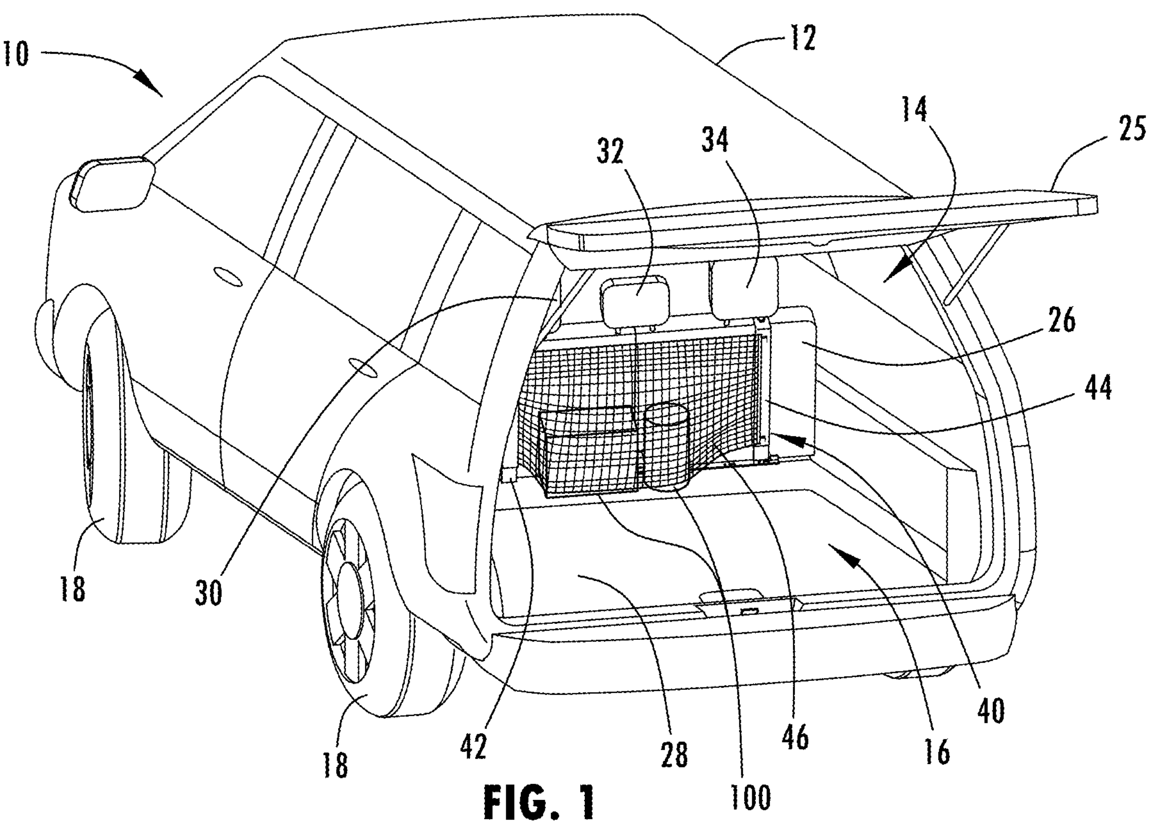
FIG. 1 is a rear perspective view of a motor vehicle with a rear liftgate in the open position exposing a rear cargo area having a cargo net assembly assembled to a rear seat assembly.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle cargo net assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-10, a cargo net assembly 40 is shown for use in a vehicle 10, such as a motor vehicle, to support and retain one or more cargo items. The cargo net assembly 40 includes a first pillar 42 having a lower end connected to a seatback of a seat assembly 20 and an upper end configured with a headrest post connector for connecting to a headrest post on an upper end of the seatback 22. The cargo net assembly 40 also has a second pillar 44 having a lower end configured to connect to the seatback 22 and a second headrest post connector at the upper end, wherein the second pillar 44 is movable relative to the first pillar such that the distance therebetween may be adjusted. The cargo net assembly 40 further includes a netting 46 extending from the first pillar to the second pillar and configured to hold cargo.

Figure 2:
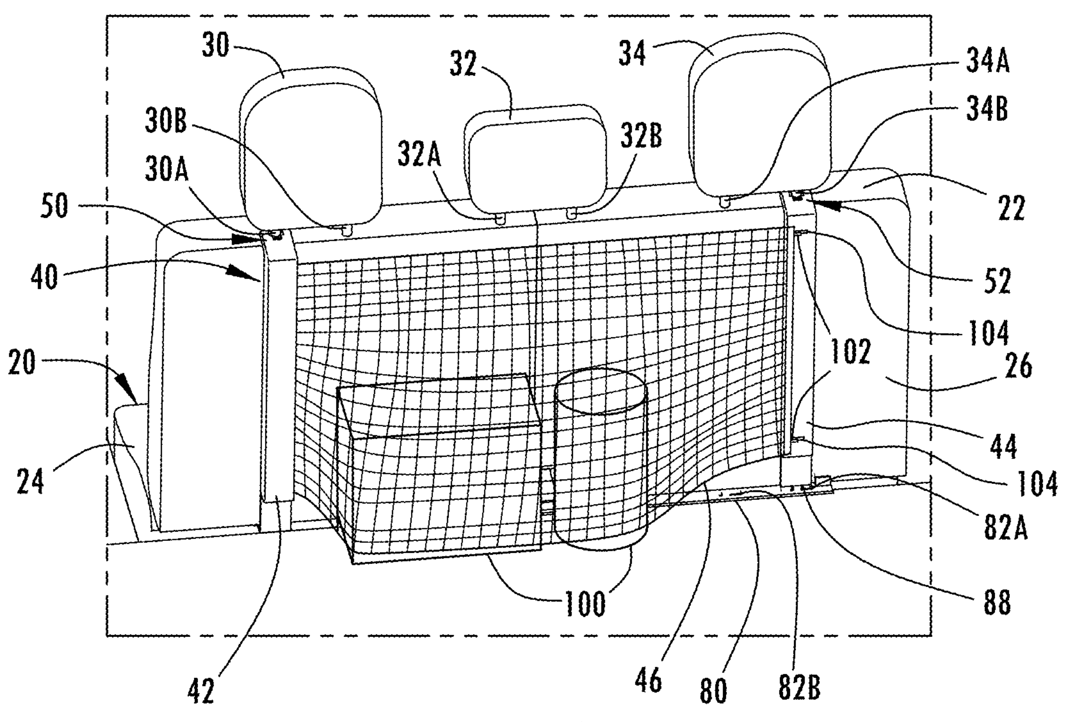
FIG. 2 is a rear view of a seat assembly having the cargo net assembly deployed in a first position and retaining cargo items.
Figure 3:
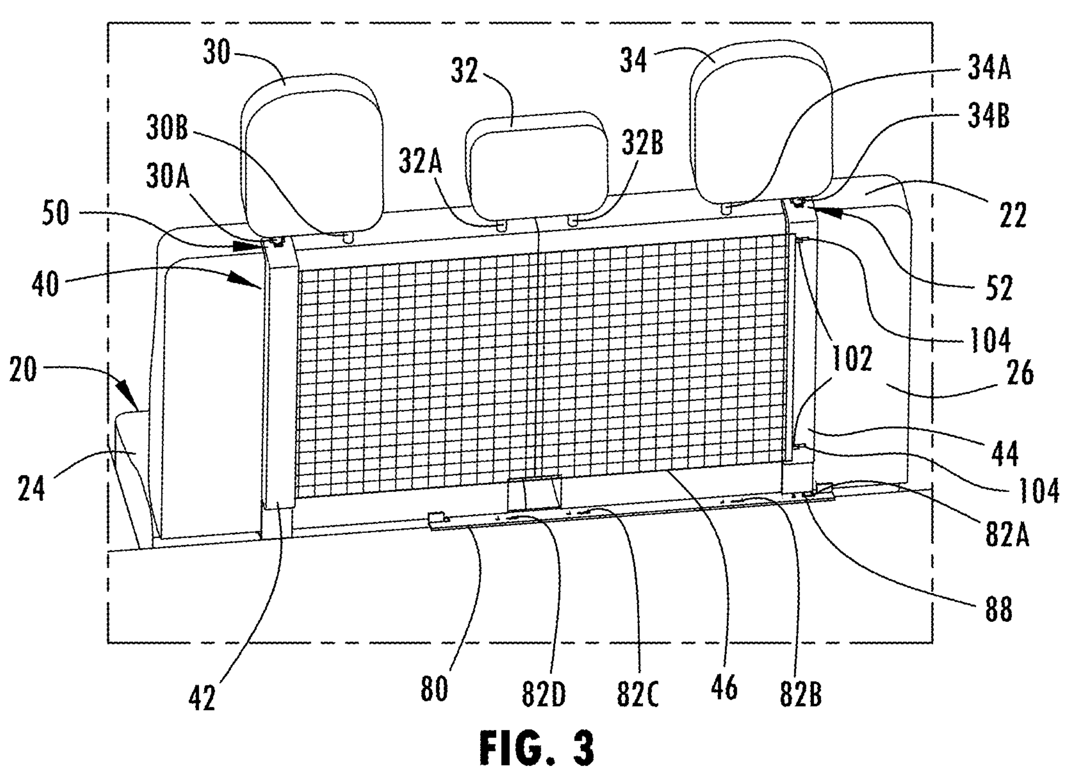
FIG. 3 is a rear perspective view of the seat assembly and the cargo net assembly in the first deployed position.
Figure 4:
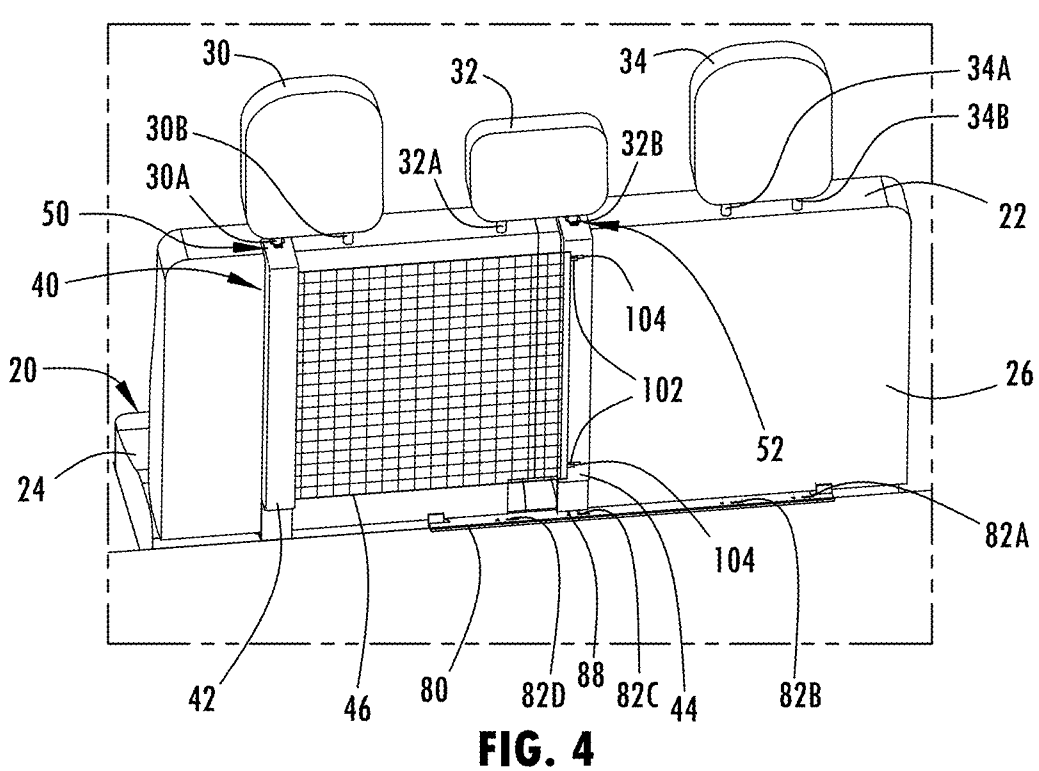
FIG. 4 is a rear perspective view of the seat assembly with the cargo net assembly in a second deployed position.

Referring specifically to FIGS. 1 and 2, the cargo net assembly 40 is shown located on a rear wall 26 of a seatback 22 of the rear seat assembly 20. The vehicle 10 may be a motor vehicle such as a wheeled automotive vehicle generally configured with a body 12 supported on a plurality of tire and wheel assemblies 18. The body 12 generally defines a cabin interior 14 which is equipped with one or more rows of seating equipped with seat assemblies. The vehicle 10 may include a front row of seating which may include a driver's seat assembly and a passenger seat assembly, and one or more rear rows of seating. The seat assembly 20 is the rear most seat assembly which has the seat base 24 and the seatback 22 and may provide for a plurality of seats such as three seats in a lateral row as shown.

Each of the seats has a headrest 30, 32 and 34 generally extending upward from an upper end of the seatback 22. The first headrest 30 includes a pair of headrest posts 30A and 30B that extend into the top end of the seatback 22 to adjustably set the height of the headrest 30. The second headrest 32 likewise includes a pair of headrest posts 32A and 32B which extend into the top end of the seatback 22 and may extend between upper and lower positions. The third headrest 34 likewise includes a pair of headrest posts 34A and 34B which extend into the top end of the seatback 22. Each of the first, second and third headrests 30, 32 and 34 thereby define the upper supporting portions of each of three seats provided by the seat assembly 20. The headrest posts 30A, 30B, 32A, 32B, 34A and 34B support the position and the height of the corresponding headrests and may be configured as cylindrical rods with adjustable height retention features such as retention notches, for example.

The vehicle 10 has a rear portion of the cabin interior 14 generally defining a rear cargo area 16. The vehicle 10 also has a liftgate 25 configured to close a rear access opening at the rear end of the vehicle 10 and to pivot about upper hinges to move to an open position as shown in FIG. 1 to allow rear end access to the rear cargo area 16. It should be appreciated that the rear cargo area 16 is generally defined between the rear row of seating equipped with rear seat assembly 20, the liftgate 25 and the interior lateral sidewalls. When the liftgate 25 is in the open position, the cargo net assembly 40 may be accessed along with other portions of the rear cargo area 16 from the rear access opening.

The cargo net assembly 40 is illustrated in FIGS. 2-5 in different deployed positions on the seatback 22 of seat assembly 20 shown in the upright seating position. The cargo net assembly 40 includes a fixed first pillar 42 having a lower end connected to the seatback of the seat assembly 20 on the rear side 26 and an upper end configured with a headrest post connector 50 for connecting to a headrest post, such as headrest post 30A, of the first headrest 30 on the upper portion of the seatback 22. The first pillar 42 may be generally fixed such that it does not move to adjust the size of the cargo net assembly 40.

The cargo net assembly 40 also includes a second pillar 44 having a lower end configured to connect to a lower portion of the seatback 22 and a second headrest post connector 52 at the upper end for connecting to a headrest post such as headrest post 34B associated with the third headrest 34, according to a first deployed position. The second pillar 44 is adjustable so that it may be moved relative to the first pillar 42 along the width of the seatback 22 to adjust the width size of the cargo net assembly 40. A user may disconnect the second pillar 44 from the connection of the second headrest post connector 50 with the headrest post 34B and may reposition the second pillar 44 aligned to connect with another headrest post to increase or decrease the width of the cargo net assembly 40, particularly the effective extended width of the netting 46. In doing so, the netting 46 is extendable and retractable to adjust the size of exposed netting.

Figures 5, 6:
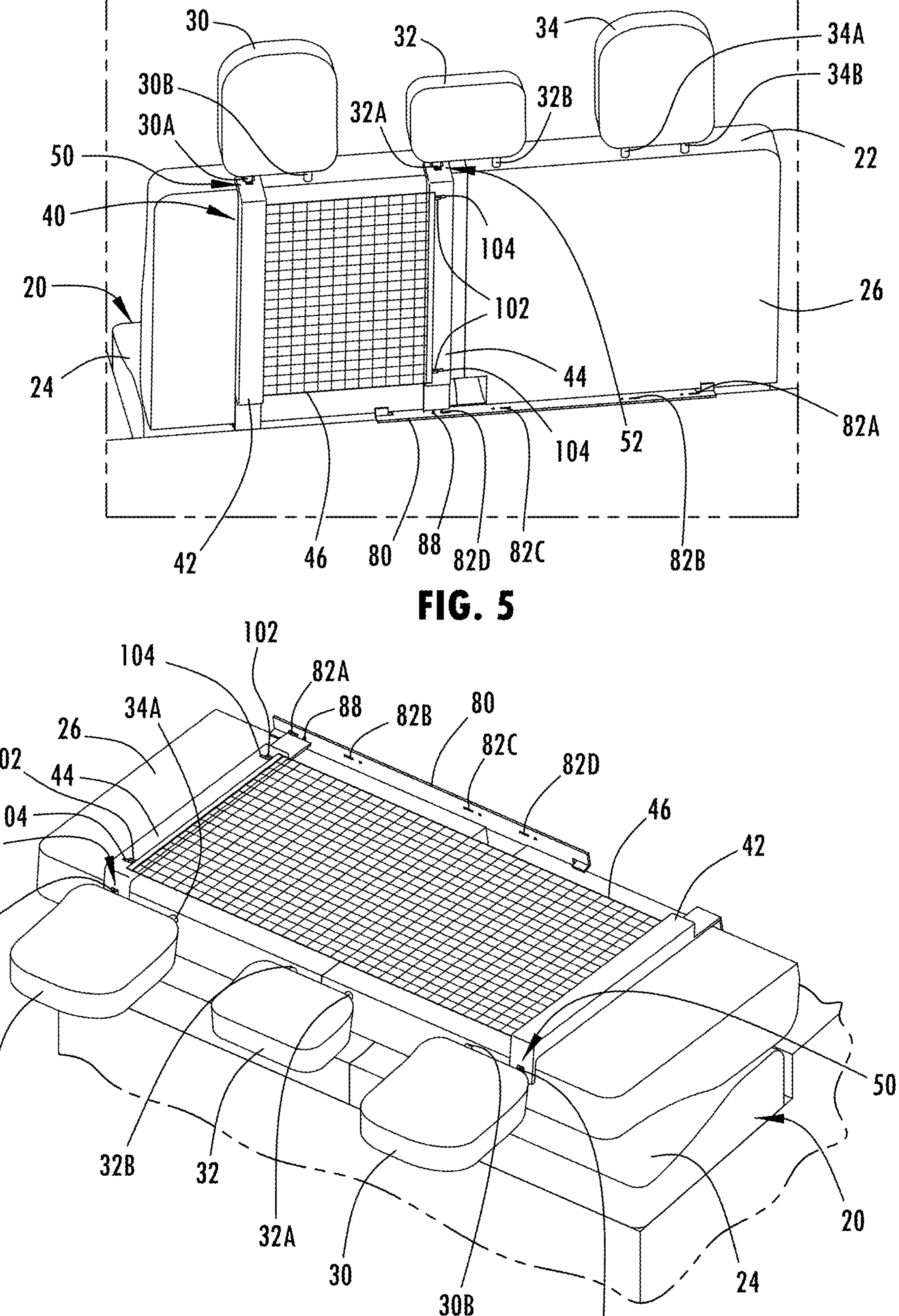
FIG. 5 is a rear perspective view of the seat assembly with the cargo net assembly in a third deployed position.
FIG. 6 is a front perspective view of the seat assembly in a folded position with the cargo net assembly in the first deployed position.

The cargo net assembly 40 may be adjusted in size by repositioning the second pillar 44 one of a plurality of positions that provide different size exposed cargo netting 46 for retaining items such as cargo items 100 shown in FIG. 2. The cargo net assembly 40 may be adjusted to a large width position as seen in FIG. 2 extending a substantial portion of the width of the seatback 22. In this position, the second pillar 44 is connected to the furthest headrest post 34B of the third headrest 34. As such, the netting 46 extends between the first pillar 42 and the second pillar 44 to provide a first size netting. The second pillar 44 may be removed and reinstalled and connected to another headrest post such as headrest post 32B of the second headrest 32 to provide a second size netting. The second pillar 44 may further be adjusted to a third size netting with the connector connected to headrest post 32A of the second headrest 32 as seen in FIG. 5. It should be appreciated that the second pillar 44 may be assembled on to any of the headrest posts 30A, 30B, 32A, 32B, 34A and 34B of the first, second and third headrests 30, 32 and 34 to provide for different width sizes of the netting 46 available for retaining cargo.

The seat assembly 20 may be reconfigured with the seatback 22 folded forward and down to a folded position as seen in FIG. 6 with the cargo net assembly 40 oriented on the top generally horizontal surface. The cargo net assembly 40 may be easily installed and uninstalled from the side of the cabin such as via a side door when the seatback 22 is in the folded seat configuration. In this folded seat configuration, the cargo net assembly 40 may retain cargo with the netting 46 which may help to reduce movement of the cargo. It should be appreciated that the size of the exposed netting 46 presented for retaining cargo may be adjusted in width while the seat is in the folded position by repositioning the second pillar 44 relative to the first pillar 42.

Figure 7:
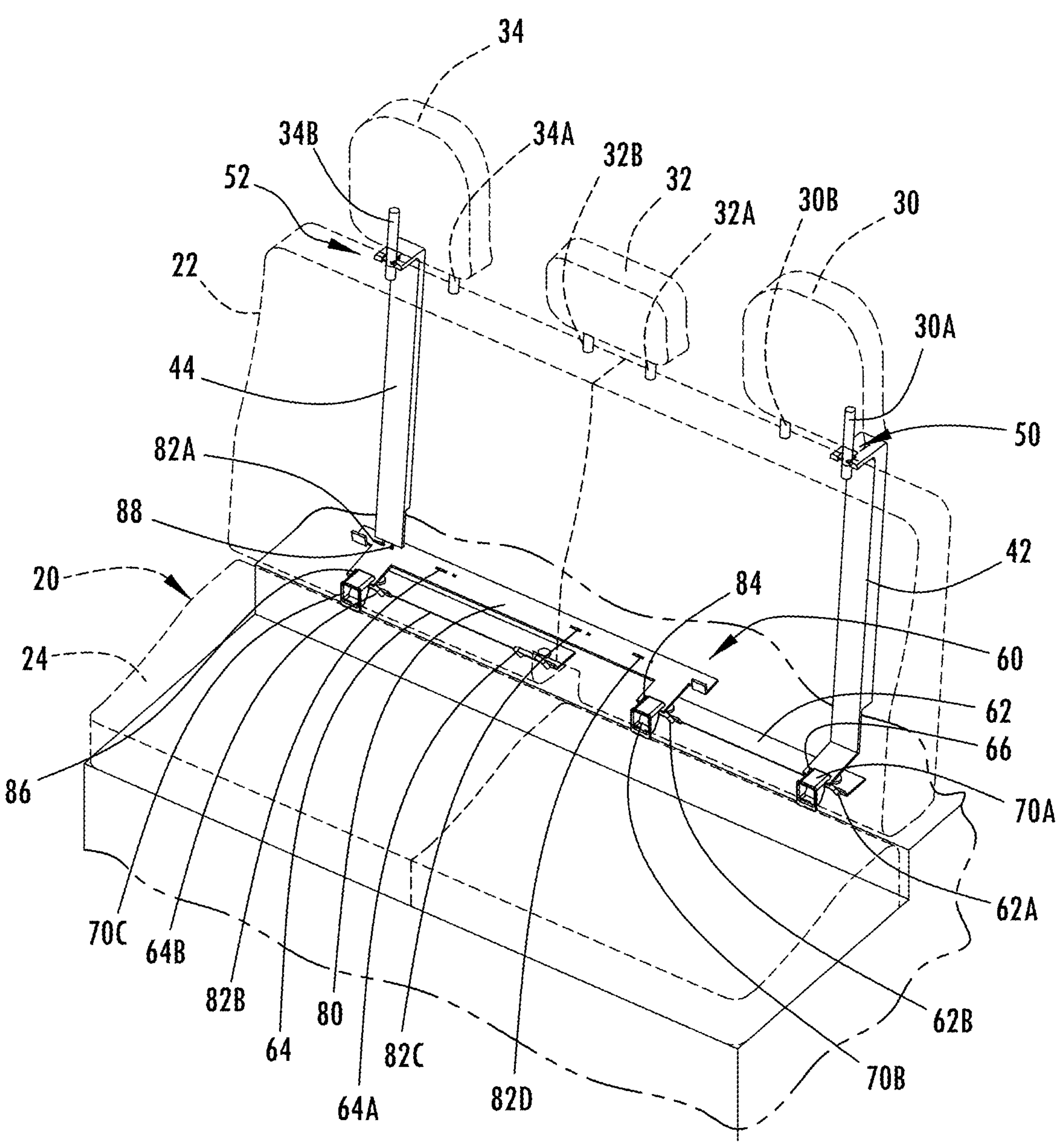
FIG. 7 is a front perspective view of the seat assembly further illustrating components of the cargo net assembly shown in phantom.
Figure 8:
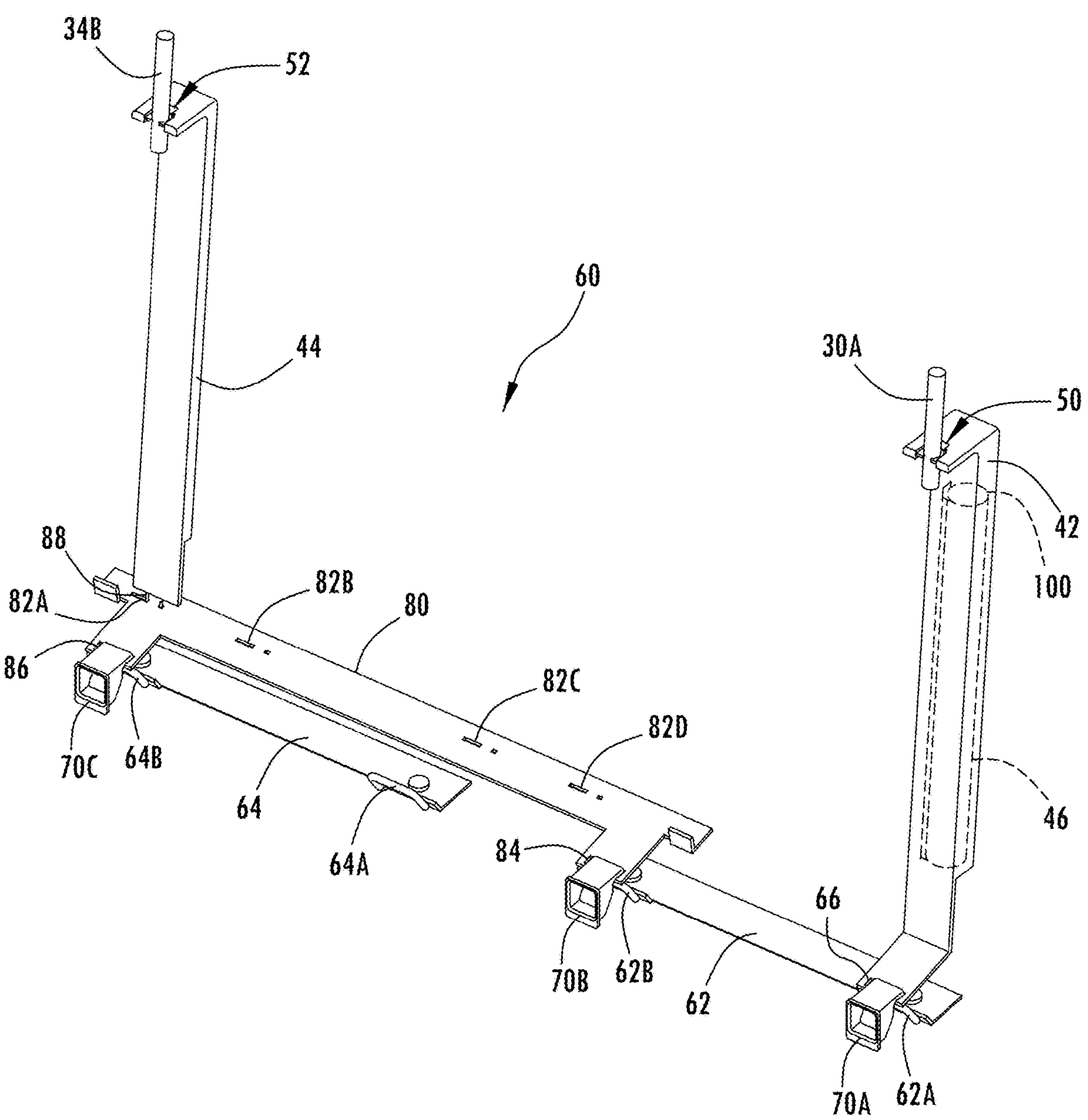
FIG. 8 is a front perspective view of the support structure of the cargo net assembly connected to headrest posts.
Figure 9:
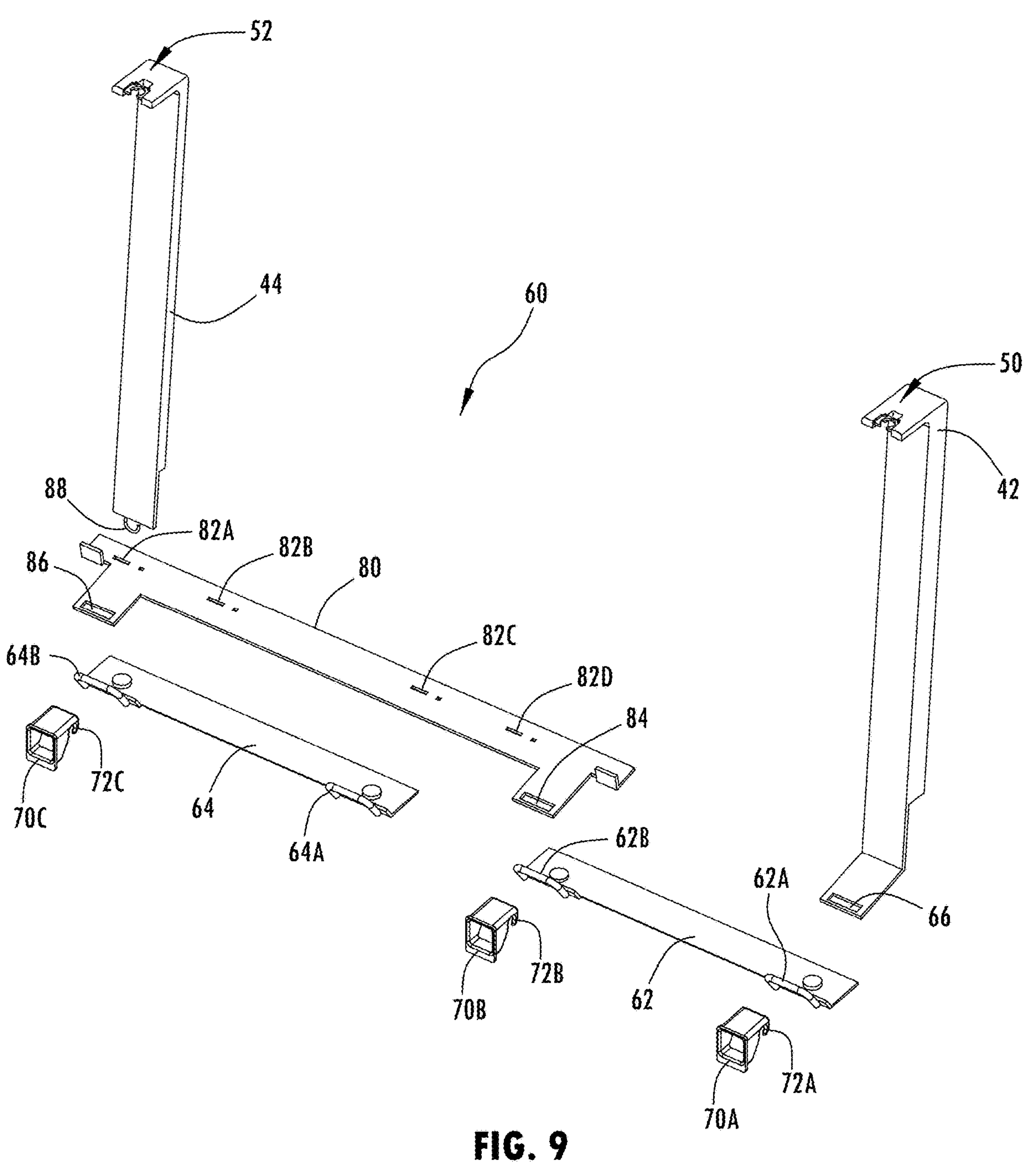
FIG. 9 is an exploded perspective view of the support structure of the cargo net assembly.

Referring to FIGS. 7-9, the cargo net assembly 40 is illustrated having a support structure for supporting the first and second pillars 42 and 44 and the netting 46 on the rear side of the seatback 22 of the seat assembly 20. The support structure 60 generally includes a plurality of ISOFIX bars on a first ISOFIX bracket 62 and on a second ISOFIX bracket 64. The first ISOFIX bracket 62 is fixedly secured to the seat and has first and second ISOFIX bars 62A and 62B which generally extend vehicle forward between the seat base 24 and the seatback 22 and may be used as a supporting structure such as for supporting an infant seat, for example. The second ISOFIX bracket 64 is fixedly secured to the seat and has third and fourth ISOFIX bars 64A and 64B which likewise extend vehicle forward between the seat base 24 and the seatback 22 to allow for a supporting structure such as for supporting an infant seat.

The lower end of the fixed second pillar 42 has a bent elbow portion extending vehicle forward with a connecting slot 66 which is configured to connect with a cap 70A. The cap 70A has a connecting arm 72A configured to be inserted within and engage the slot 66 to fixedly hold the fixed first pillar 42 in position on the seat. The upper end of the first seat pillar 42 has a headrest post connector 50 configured to connect to headrest post 30A.

The cargo net assembly 40 also includes a base plate 80 which has a plurality of adjustable receivers 82A-82D configured as slots that may be used to connect and support the lower end of the second pillar 44. The base plate 80 has a connecting slot 84 located at one end which is configured to be retained by a second cap 70B having connector arms 72B proximate to or within the second ISOFIX bracket 62B. The opposite end of the base plate 80 has a further connecting slot 86 configured to engage a third cap 70C with connecting arms 72C proximate to or within ISOFIX bracket 64B. As such, the base plate 80 may be fixed in place and supported on the ISOFIX brackets 62 and 64 and thereby held in position on the rear side 26 of the seatback 22.

The second pillar 44 has an adjustable connector 88 at the lower end as shown in the form of a hook which is configured to engage within one of the retaining slots 82A-82D, depending on the size of the deployed netting 46 that is desired. The hook configured connector 88 may be inserted within one of the elongated slots 82A-82D and slid over laterally to connect to an adjacent slot to fix the lower end of the first pillar 44 in place. The upper end of the second pillar 44 has a headrest post connector 52 that may be connected to a selectable one of the other headrest posts.

Figure 8A:
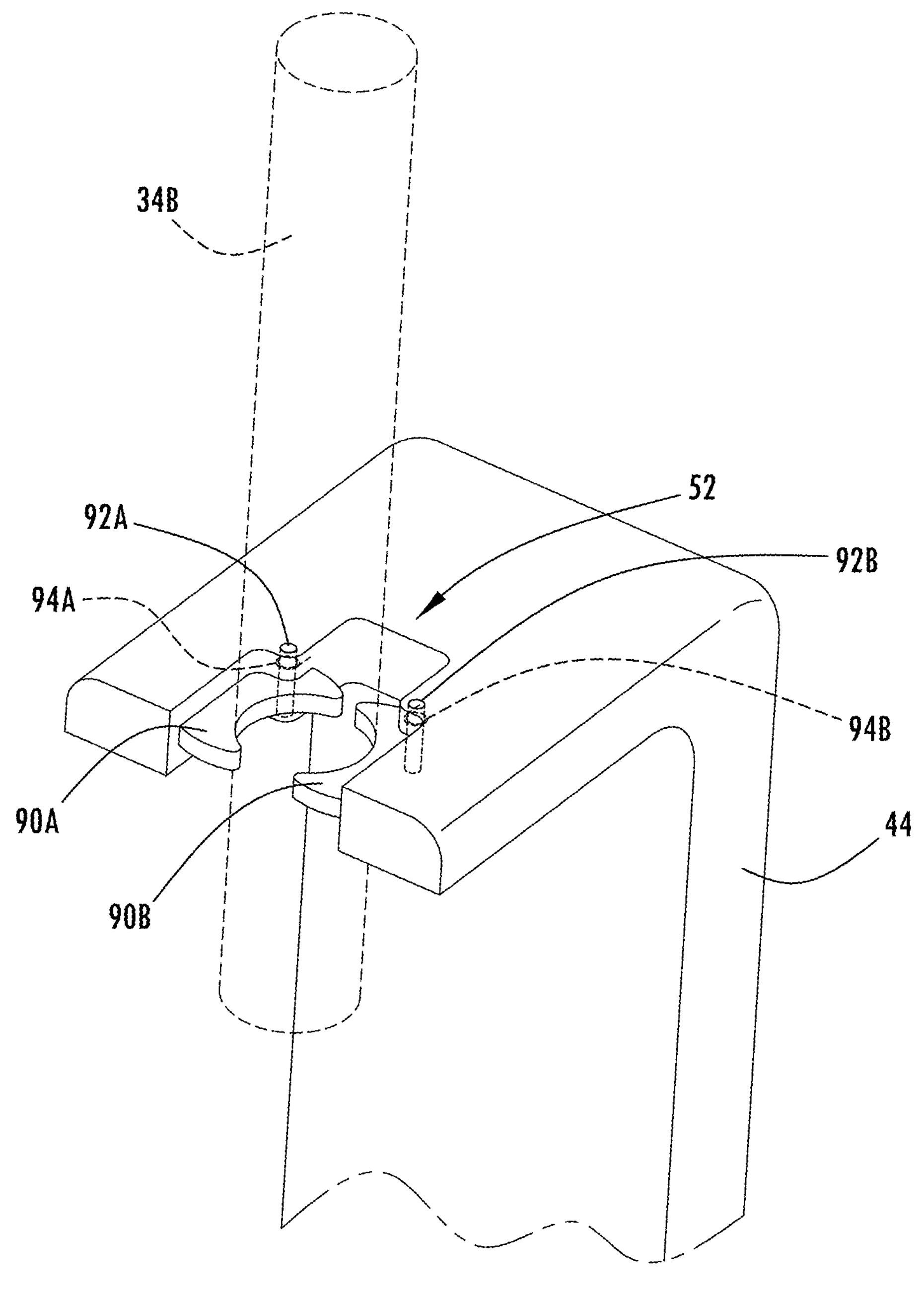
FIG. 8A is an upper perspective view of one pillar connector of the cargo net assembly engaging the headrest post.

The first and second pillars 42 and 44 each have a headrest post connector 50 or 52 respectively, at the upper end thereof for connecting to a headrest post on the seatback. One of the headrest post connectors 52 is shown in FIG. 8A engaging headrest post 34B. The headrest post connector 50 has first and second C-shaped connectors 90A and 90B which generally face each other and are configured to receive a cylindrical shape headrest post 34B. The first C-shaped connector 98 is pivotally coupled to the upper end of the second pillar 44 via a vertically aligned pivot pin 92A which may be spring biased with a bias spring 94A toward a closed position facing the opposing C-shaped connector 90B. The second C-shaped connector 90B likewise has a vertically aligned pivot pin 92B connected to the upper end of the second pillar and a bias spring 94B to bias the second C-shaped connector to the engaged position. Accordingly, the headrest post connector 52 may be installed onto a headrest post 34B and may be removed from the post 34B and reattached to another headrest post to change the deployed width size of the netting 46. It should be appreciated that the headrest post connector 50 may be configured the same or similar to the headrest post connector 52.

Figure 10:
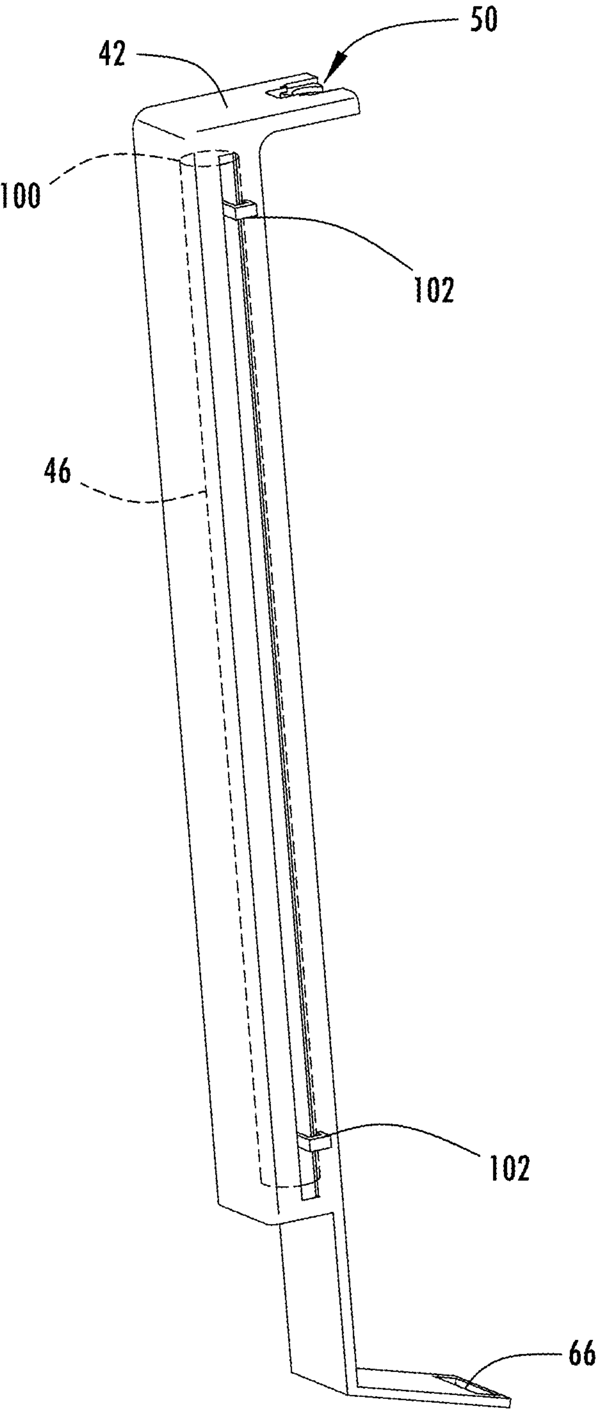
FIG. 10 is a side perspective view of the fixed pillar of the cargo net assembly having a roller configured to wind up a portion of the netting.

Referring to FIGS. 8 and 10, the first pillar 42 is shown having a roller mechanism 90 in the form of a reel that may be used to wind up and thereby retract the netting 46 into shorter width positions and to unwind and thereby extend the netting 46 to elongated longer width positions. The roller mechanism 90 may be installed on or within the housing of the first pillar 42 extending substantially the height of the first pillar 42 and may include a spring bias mechanism to bias the roller mechanism 90 in a direction that winds up the netting 46 to a retracted configuration, according to one example.

Accordingly, the cargo net assembly 40 advantageously provides for an adjustable cargo netting 46 on the rear side of the seatback 22 of a vehicle seat assembly 20 to retain one or more items of cargo in a netting 46. The cargo net assembly 40 advantageously is adjustable in width size such that the size of the netting 46 available for holding cargo may be adjusted easily by a user.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A cargo net assembly for a vehicle, the cargo net assembly comprising:
- a first pillar having a lower end connected to a seatback of a seat assembly and an upper end configured with a headrest post connector for connecting to a headrest post on an upper end of the seatback;
- a second pillar having a lower end configured to connect to the seatback and a second headrest post connector at an upper end for connecting to a headrest post; and
- netting extending from the first pillar to the second pillar and configured for holding cargo, wherein the second pillar is adjustable in distance from the first pillar to adjust a size of the netting, and wherein the lower ends of the first and second pillars are supported by one or more brackets connected directly to the seat assembly.

2. The cargo net assembly of claim 1, wherein the second pillar is configured to disconnect from one headrest post and connect to another headrest post to adjust a size of the netting.

3. The cargo net assembly of claim 2, wherein the first pillar is fixed such that it does not move to adjust the size of the netting.

4. The cargo net assembly of claim 1, further comprising a roller mechanism operatively coupled to one of the first and second pillars for retracting and extending the netting during movement of the second pillar relative to the first pillar.

5. The cargo net assembly of claim 4, wherein the roller mechanism is operatively coupled to the first pillar.

6. The cargo net assembly of claim 1, wherein the second headrest post connector comprises a latch mechanism.

7. The cargo net assembly of claim 6, wherein the first headrest post connector comprises a latch mechanism.

8. The cargo net assembly of claim 1, wherein the lower end of the second pillar comprises a hook for engaging a slot in a lower support structure.

9. The cargo net assembly of claim 8, wherein the lower support structure has a plurality of slots that are selectively engageable with the hook.

10. The cargo net assembly of claim 1, wherein the one or more brackets include an ISOFIX bracket.

11. A vehicle seat assembly comprising, the vehicle seat assembly comprising:
- a seat base;
- a seatback;
- one or more headrests connected to the seatback with a plurality of headrest posts; and
- a cargo net assembly comprising:
  - a first pillar having a lower end connected to the seatback of a seat assembly and an upper end configured with a headrest post connector for connecting to a first headrest post on an upper end of the seatback;
  - a second pillar having a lower end configured to connect to the seatback and a second headrest post connector at an upper end for connecting to a second headrest post; and
  - netting extending from the first pillar to the second pillar and configured for holding cargo, wherein the second pillar is adjustable in distance from the first pillar to adjust a size of the netting, and wherein the lower ends of the first and second pillars are supported by one or more brackets connected directly to the seat assembly.

12. The vehicle seat assembly of claim 11, wherein the second pillar is configured to disconnect from one headrest post and connect to another headrest post to adjust a size of the netting.

13. The vehicle seat assembly of claim 11, wherein the first pillar is fixed such that it does not move to adjust the size of the netting.

14. The vehicle seat assembly of claim 11, further comprising a roller mechanism operatively coupled to one of the first and second pillars for retracting and extending the netting during movement of the second pillar relative to the first pillar.

15. The vehicle seat assembly of claim 14, wherein the roller mechanism is operatively coupled to the first pillar.

16. The vehicle seat assembly of claim 11, wherein the first and second headrest post connectors comprise first and second latch mechanisms.

17. The vehicle seat assembly of claim 11, wherein the lower end of the second pillar comprises a hook for engaging a slot in a lower support structure.

18. The vehicle seat assembly of claim 17, wherein the lower support structure has a plurality of slots that are selectively engageable with the hook.

* * * * *